(12) United States Patent
Jeunehomme et al.

(10) Patent No.: US 7,298,884 B2
(45) Date of Patent: Nov. 20, 2007

(54) METHOD AND APPARATUS FOR CLASSIFICATION OF PIXELS IN MEDICAL IMAGING

(75) Inventors: Fanny Jeunehomme, Versailles (FR); Serge Muller, Guyancourt (FR); Razvan Iordache, Paris (FR)

(73) Assignee: General Electric Company, Schenectady, NY (US)

( * ) Notice: Subject to any disclaimer, the term of this patent is extended or adjusted under 35 U.S.C. 154(b) by 276 days.

(21) Appl. No.: 11/054,090

(22) Filed: Feb. 9, 2005

(65) Prior Publication Data

US 2005/0259857 A1 Nov. 24, 2005

(30) Foreign Application Priority Data

May 21, 2004 (FR) .................................. 04 05524

(51) Int. Cl.
*G06K 9/62* (2006.01)
(52) U.S. Cl. ..................... 382/132; 382/224; 378/37
(58) Field of Classification Search .................. None
See application file for complete search history.

(56) References Cited

U.S. PATENT DOCUMENTS

| | | | |
|---|---|---|---|
| 5,003,979 A | | 4/1991 | Merickel et al. |
| 5,133,020 A | * | 7/1992 | Giger et al. ............... 382/128 |
| 5,544,219 A | * | 8/1996 | Muller et al. ............... 378/210 |
| 5,579,360 A | * | 11/1996 | Abdel-Mottaleb ........... 378/37 |
| 5,832,103 A | | 11/1998 | Giger et al. |
| 5,984,870 A | * | 11/1999 | Giger et al. ............... 600/443 |
| 6,058,322 A | * | 5/2000 | Nishikawa et al. ......... 600/408 |
| 6,246,782 B1 | * | 6/2001 | Shapiro et al. ............. 382/128 |
| 6,317,617 B1 | * | 11/2001 | Gilhuijs et al. ............. 600/408 |
| 6,427,082 B1 | | 7/2002 | Modell et al. |
| 6,970,587 B1 | * | 11/2005 | Rogers ....................... 382/132 |

| | | | |
|---|---|---|---|
| 2002/0003861 A1 | * | 1/2002 | Rick et al. ................ 378/98.12 |
| 2002/0159565 A1 | | 10/2002 | Muller et al. |
| 2002/0165837 A1 | * | 11/2002 | Zhang et al. .................. 706/16 |

(Continued)

FOREIGN PATENT DOCUMENTS

WO WO 00/05677 A 2/2000

OTHER PUBLICATIONS

Marx, C., et al., Contrast-enhanced digital mammography (CDEM): phantom experiment and first clinical results, Proc. SPIE, vol. 4682, pp. 174-181, 2002.

*Primary Examiner*—Brian P. Werner
*Assistant Examiner*—Edward Park
(74) *Attorney, Agent, or Firm*—Cantor Colburn LLP

(57) ABSTRACT

An apparatus and method for medical imaging, particularly for mammography, wherein a body organ, such as a breast, is exposed to X-rays and the X-rays are collected after attenuation through the object. The recorded attenuations are processed and displaying a result of this processing in the form of a representation of an image of the object. The processing of the recorded attenuations form includes automatic classification of zones of the breast into pathological or non-pathological classes. The automatic classification takes into account at least one classification input into the apparatus in advance in association with data that can be collected by the apparatus, and using this prior classification as a reference in order to produce a classification of the same type if there is similarity between the collected data and the data associated with this reference classification.

25 Claims, 2 Drawing Sheets

U.S. PATENT DOCUMENTS

2003/0194050 A1    10/2003    Abdalmajeid
2003/0194121 A1    10/2003    Abdalmajeid
2003/0231790 A1*   12/2003    Bottema ..................... 382/128
2005/0027188 A1*    2/2005    Metaxas et al. ............ 600/410

* cited by examiner

METHOD AND APPARATUS FOR CLASSIFICATION OF PIXELS IN MEDICAL IMAGING

CROSS-REFERENCE TO RELATED APPLICATIONS

This application claims the benefit of a priority under 35 USC 119(a)-(d) to-French Patent Application 04 05524 filed May 21, 2004, the entire contents of which are hereby incorporated by reference.

BACKGROUND OF THE INVENTION

An embodiment of the invention relates to a method and apparatus for medical imaging and in particular to a method and apparatus for the classification of pixels in medical imaging. An embodiment of the invention relates to Contrast Medium-enhanced Mammography (CMM) by X-rays and the injection of a contrast medium.

Mammography is medical imaging intended particularly for the detection of tumors by examination of successive images taken to reveal the variation with time of impregnation of the contrast medium and its gradual disappearance. In mammography the contrast medium tends to attenuate X-rays significantly more than a non-impregnated tissue, and thus reveals particularly vascularised zones such as tumors. But the variation of contrast within the breast itself provides an important indication about whether or not tumors are present, by the rate at which this contrast appears and disappears.

At present, contrast medium-enhanced mammography is practiced within the context of MRI, a technique that comprises making molecules composing the examined organ vibrate. Within this context, the variation of contrast in the breast is displayed on the screen in the form of a sequence of images that the practitioner interprets based on experience, as revealing or not revealing the presence of a tumor.

Marx et al., "Contrast-enhanced digital mammography (CEDM): phantom experiment and first clinical results", Proc. SPIE—International Soc. for Optical Engineering, vol. 4682, pp. 174-181, 2002, proposes to produce maps representing the distribution of some parameters in the breast. These parameters are measurements illustrating some kinetic aspects of contrast variation obtained from a sequence of X-ray images.

However, the diagnosis work to be done by the practitioner is still considerable.

BRIEF DESCRIPTION OF THE INVENTION

According to an embodiment of the invention, an apparatus comprises means for exposing an object, such as a body organ, e.g., the breast, to a source of radiation, such as an X-ray beam; means for collecting the radiation after attenuation through the object; means for processing recorded attenuations and means for displaying the result of this processing in the form of a representation on an image of the object. The means for processing the recorded attenuations form means for automatic classification of zones of the object into pathological classes The means for automatic classification is suitable for taking account of at least one classification input into the apparatus in advance in association with data that can be collected by the apparatus, and using this prior classification as a reference in order to produce a classification of the same type if there is similarity between the collected data and the data associated with this reference classification.

An embodiment of the invention is a method for medical imaging, particularly for mammography, comprising exposing an object, such as a body organ, e.g., a breast, to radiation; collecting the radiation after attenuation through the object; processing recorded attenuations and displaying the result of this processing in the form of a representation on an image of the breast, the processing of the recorded attenuations comprises automatically classifying zones of the object into pathological classes, the automatic classification taking into account at least one prior classification input in association with data that can is collected, and using this prior classification as a reference in order to produce a classification of the same type if there is similarity between the collected data and the data associated with this reference classification.

BRIEF DESCRIPTION OF THE DRAWINGS

Other characteristics, purposes and advantages of the invention will become clear after reading the detailed description given below with reference to the attached figures among which.

DETAILED DESCRIPTION OF THE INVENTION

Figure 1:
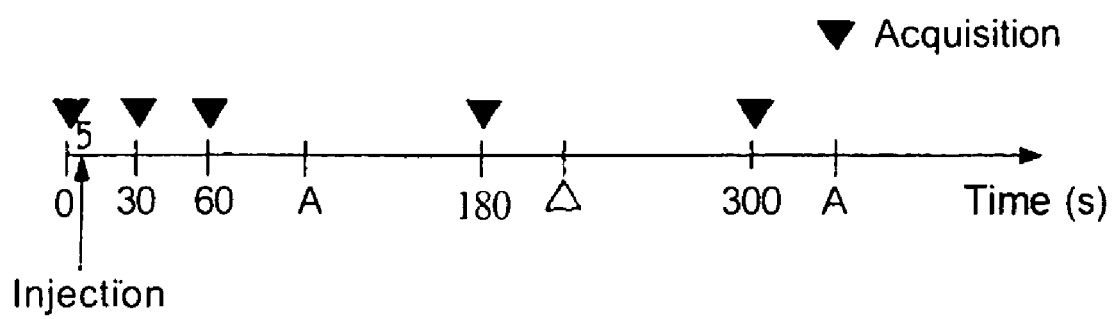
FIG. 1 shows a time axis representing different instants at which images are taken during impregnation/deimpregnation of a contrast medium.

An embodiment of the invention is to improve the way in which the practitioner is assisted in using X-rays for contrast medium enhanced mammography, in diagnosing the presence of a particular pathology, and particularly for identification of the presence of malignant tumors In this description, the term "grey level" will denote a value representing as possible the attenuation recorded in the presence of the contrast medium. In practice, these values are obtained after application of a logarithm to the attenuation actually recorded, since in the known manner the attenuation induced by the presence of a contrast medium, typically a product containing iodine, is exponential to the local concentration of the product. The logarithm thus applied outputs a value approximately proportional to the attenuation due to the product containing iodine after passing through the breast, in other words the thickness actually impregnated by the product containing iodine.

In a first variant, each point on the image (or pixel) of the examined breast is associated with a vector in n dimensions, in which each dimension corresponds to a different observation instant of this same pixel. In other words, this vector associated with each pixel represents the rate at which the contrast appears in this particular pixel.

Thus, for each point located at the same location in each successive image during impregnation/disappearance of the contract medium, there is a vector $X_{i,j}$ associated with this point for which each of the components $G_n(i,j)$ correspond to the grey level recorded at each successive instant. N is the number of successive sequences, and i,j are the coordinates of the same pixel in each successive image in the sequence of images.

The result is thus a vector $X_{i,j}$ defined as follows:

$$X_{i,j} = \begin{Bmatrix} G_1(i,j) \\ \vdots \\ G_n(i,j) \end{Bmatrix}$$

Therefore the coefficients of this vector are distributed from $G_1$ to $G_n(i,j)$ and are representative of grey levels obtained in instants $t_1$ to $t_n$.

The first variant uses these vectors $X_{i,j}$ to identify a similarity between them and vectors representing a typical variation in contrast with time in the presence of a specific pathology. More generally, the objective is to sort the different vectors corresponding to different points into classes that could reveal the existence of some pathologies.

In one embodiment, these various vectors are classified into four categories. A first category comprises vectors that could reveal the presence of a malignant tumor at the pixel i,j considered. A second category comprises the vectors that could indicate the presence of a benign tumor at the pixel i,j considered. A third category comprises vectors that could indicate the presence of healthy tissue (parenchyma) at the pixel i,j considered. A fourth category comprises vectors that could indicate the presence of a blood vessel at the pixel i,j considered.

In another embodiment, with the purpose of detecting tumors, the first and second classification categories (malignant tumors and benign tumors) may be coincident.

The various categories may also be distributed into vessels, tumors, and normal tissue, for detection purposes.

The following processing can be applied in order to determine which of these categories is applicable.

Figure 3:
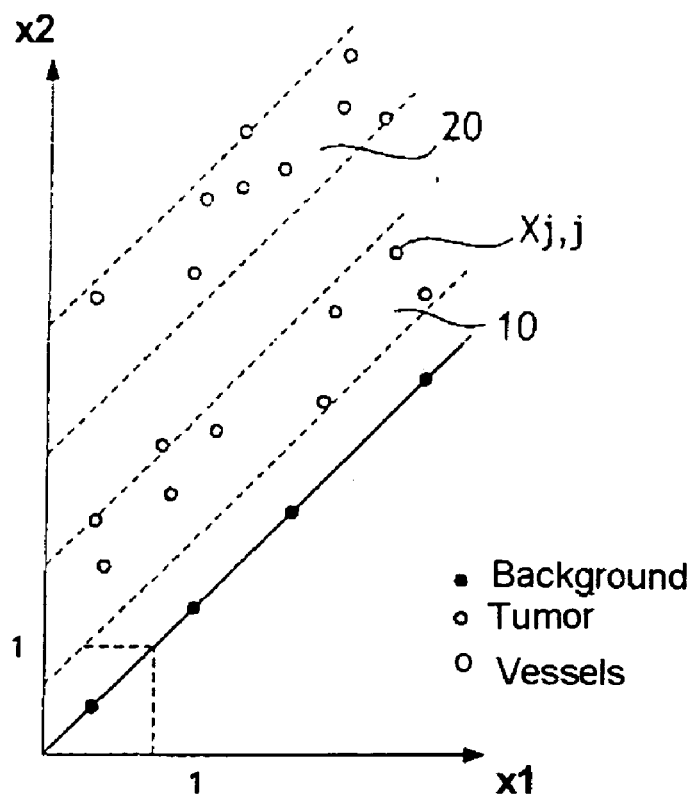
FIG. 3 is a diagram showing a distribution of points in a several dimensional space used for identification of a classification of a local zone of the breast.
Figure 4:
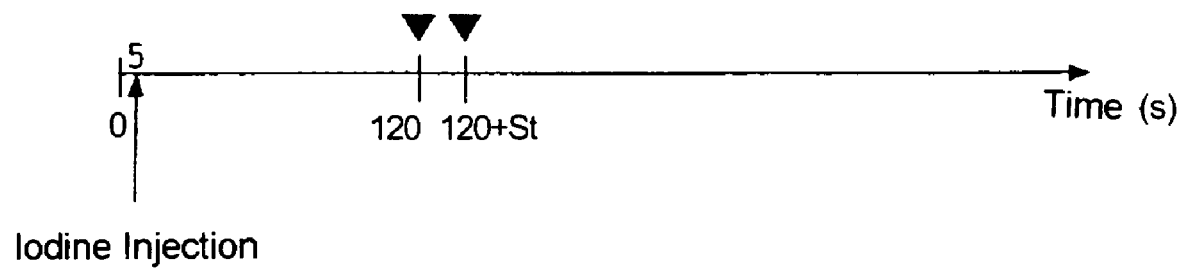
FIG. 4 is a time axis illustrating the use of two photos with two different energies in an embodiment of the invention.

Each vector may be considered to belong to an n dimensional space, in which each dimension represents a given instant. The position of the point according to this dimension then represents the value of the grey level observed at the instant corresponding to this dimension. This type of space is shown in FIG. 3, in two dimensions to simplify the illustration. Therefore, these two dimensions correspond to two images at two different instants. A vector $X_{i,j}$ will be located on a median at 45° if the values of the grey levels are the same at instants $t_1$ and $t_2$.

In this case, the instant $t_1$ was an image instant at which no contrast medium had yet been impregnated in the breast, and it can be understood that the point would belong to, the oblique line at 45° if the contrast medium were not present at instant $t_2$ either. These points located on the oblique may also be located on zones of the breast in which vascularization is observed to be negligible or non-existent. The points thus positioned are classified as "parenchyma" in FIG. 3.

Figure 2:
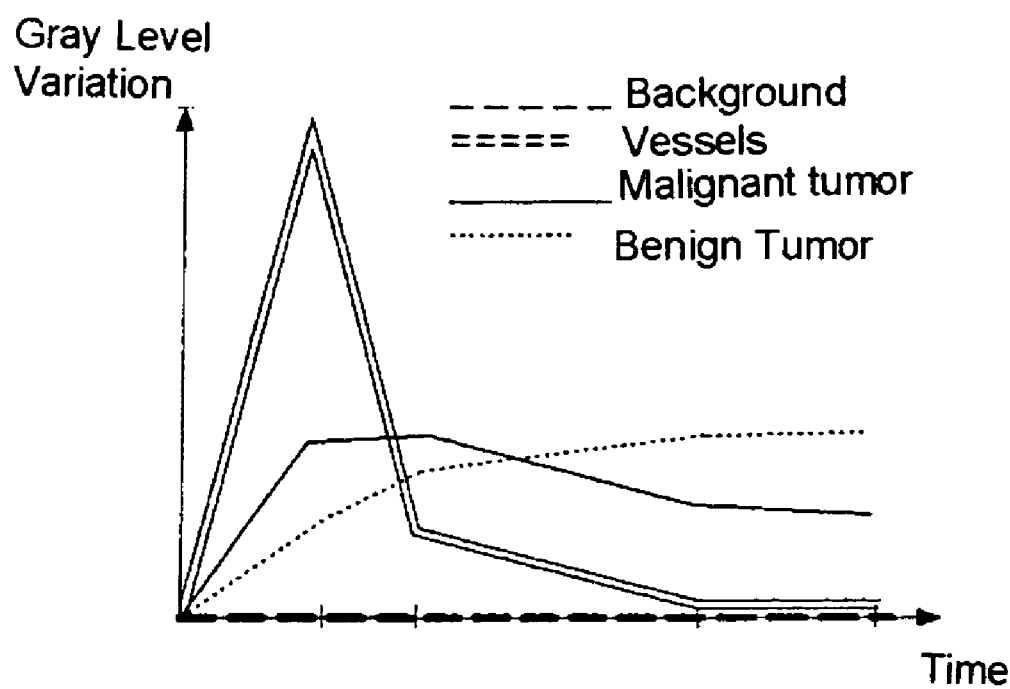
FIG. 2 shows the variation of a grey level measured during impregnation/deimpregnation of a breast by the contrast medium.

Thus, FIG. 2 shows the variation in the grey level as a function of time, depending on whether the point at which this grey level is observed forms part of a common tissue (parenchyma), a vessel, a malignant tumor or a benign tumor:

On the other hand, a vector $X_{i,j}$ will be positioned further above this oblique when the impregnation at time $t_2$ is greater.

Two oblique bands 10 and 20 are shown, one band 10 close to the median passing through the origin, and the other 20 further towards the top. Therefore, the low band 10 represents a location in the breast in which the impregnation at time $t_2$ is relatively low. Therefore, the highest band 20 represents locations within the breast at which impregnation are already very high at time $t_2$.

It is considered that points with low impregnation at time $t_2$ (low band 10) correspond to the presence of a tumor, while points with high impregnation at time $t_2$ (high band 20) correspond to the presence of a vessel at the point considered.

It should be noted now that it is known that malignant lesions/tumors cause a very fast increase in the contrast, followed by a constant period, and then fast disappearance of the contrast. It should be noted also that benign lesions/tumors are marked by a gradual increase in the contrast. It should be noted also that vessels are obviously affected by fast contrast variations. Other tissues are less sensitive to contrast variations.

When considering a number n of successive images, the same processing is performed but this time in a space with n dimensions. The zones corresponding to the different classification categories are then zones in this space with n dimensions.

In one embodiment, the vectors thus localized on particular classification zones are preferably vectors obtained after preprocessing. One desirable preprocessing comprises subtracting using an initial vector corresponding to an image taken without the presence of a contrast medium (this initial image is called the mask). For example, another type of preprocessing may comprise noise elimination filtering.

The classification may also be made on normalized data to compare image sequences acquired under different conditions. Data may be normalized to compensate for radiation conditions at different energies. Data may also be normalized to compensate for a variable breast thickness.

Additional components may also be provided in the vector, such as the number of sign changes in recorded grey levels during the image sequence, or such as the patient's age, weight or any other data related to the patient's medical history. This data is also integrated in the n dimensional space, each time in the form of an additional dimension subsequently used for determining classifications.

In one variant, the vector $X_{i,j}$ also includes the coordinates of the pixel considered in space. This embodiment can avoid incoherent classification variations such as sudden classification changes in nearby pixels.

In another embodiment, the dimensions of the classification space do not necessarily correspond to a sequence of measurement instants. Each dimension is dedicated to positioning in this space of a value of a kinetic parameter calculated on the contrast variation. Thus, one of the dimensions can be dedicated to the maximum recorded value of the slope while determining the contrast at the pixel considered. Another dimension can represent the maximum value of the contrast recorded at the same pixel considered. Another dimension can represent the hold duration of the maximum contrast at the same pixel considered.

In this variant, the m parameters thus represented in the n dimensional space can easily be compared with data from previous sequences of images, including when these images were taken at different times, in other words at different number of times $t_1 \ldots t_n$ or with a variable distribution in time.

Thus, FIG. 1 shows two image sequences (corresponding to the upper triangles and the lower triangles respectively) that can be compared more easily because these kinetic parameters have been produced, although the images were not taken at the same instants.

According to a second embodiment of the invention, the space in which the vectors $X_{i,j}$ are shown is a two dimensional space, in which these two dimensions correspond to different radiation energies used at different times or at the same time. In this variant, the two instants are preferably very close to each other, in other words in practice as close as possible.

This embodiment provoked a contrast difference between these two images, due either to a different reaction of the same dose of the contrast medium facing two different radiation energies. For example, one of the radiations is located at about 25 to 35 keV, while the other is about 40 to 49 keV. Thus advantage is taken that a contrast medium, typically a product containing iodine, has a capacity to attenuate X-rays that varies as a function of the energy in the rays passing through it.

It is known that the attenuation coefficient p varies as a function of the energy of the X-rays according to a variation law by which the value of μ suddenly changes at a precisely determined energy, this sudden change currently being called the K-edge. Thus, when the two energies are located on the opposite sides of this K-edge, the difference in contrast is particular high between the two acquisitions.

Consequently, at pixels in a position corresponding to a strong presence of a substance containing iodine, the contrast will be sensitive to the variation of energy between the two images. On the other hand, zones without this impregnation will only have a small reactivity to the energy variation.

These two acquisitions, preferably very close, are more generally made at an optimum instant for observing such contrasts and their differences, after the injection of the contrast medium. Thus in this approach, the kinetic acquisition is replaced by a double energy acquisition, the two images being acquired at different radiation spectra (and therefore at different energies). One of the spectra advantageously corresponds to a normal energy level for a conventional mammographic examination, the other spectrum for example being a spectrum typically used in the context of an enhanced contrast method.

The contrast for pixels with a low impregnation will be similar at times $t_1$, and $t_2$, and will produce vectors $X_{i,j}$ close to the oblique at 45° passing through the origin. Pixels i, j with strong impregnation will correspond to vectors $X_{i,j}$ well above the oblique.

The variable height position of the vectors $X_{i,j}$ makes it possible to classify them in different zones depending on the classification category mentioned above to which they belong, if any. Consequently, images taken at instants $t_1$ and $t_2$ within the kinetic of the impregnation/deimpregnation reaction are particularly revealing of the different categories.

In the above, we described the application of two radiations at different energies chosen to be on each side of the sudden change in the attenuation coefficient. However, this approach is also possible even if the two energies are not on opposite sides of the K-edge. Thus, a contrast difference can also be used when it is due to the continuous variation of the attenuation coefficient as a function of the radiation energy, in other words when the two energies chosen are located in the typical part of the variation of the attenuation coefficient, and not on opposite sides of the K-edge.

Double energy acquisitions may be carried out many times while the contrast is increasing/reducing, and be analyzed in a space with 2n dimensions like the spaces mentioned above. Recommendations for spatial consistency, the use of data applicable to the patient, pre-processing of vectors, normalization of data, use of kinetic parameters derived from the variation in contrast differences, may also be applicable in this "double energy" variant.

We will now describe the operation of a means for processing capable of making the classification in one of the spaces with two dimensions or n dimensions described above. This means for processing are means capable of acquiring reference data used subsequently for automatic production of the classification. To achieve this, this means (apart from conventional data processing equipment) could implement a network of neurons or a machine with support vectors. This means will use initial information input into the system as a reference result. This information is defined as reference information preferably contains vectors $X_{i,j}$ like those defined above that can be used in the classification space with n or with m dimensions. Therefore, mean for classification are intended to be able to input vectors that can be used according to any one of the disclosed embodiments, and take account in the device of the fact that these input vectors correspond to a pixel belonging to one of the classification categories.

A first operating mode comprises learning or training in the means for processing by inputting a collection of test data with predefined and associated classifications, in a preliminary phase. Thus, in a first embodiment, there are distinct implementation steps for the apparatus and method performed at different times. One step comprises acquisition of learning data. Another step is how to use the apparatus, in other words, application of learning acquired on specific acquisitions.

In the variant in which the means for processing use vectors comprising successive grey levels, the training vectors will comprise a series of successive grey levels at the pixels considered. Each of these vectors is associated with the data according to which the corresponding pixel belongs to one of the classification categories, in a predefined manner.

A vector encountered afterwards will be categorized as belonging to the same class as one of the reference vectors if it is similar to this reference vector, for example, at a distance less than a predetermined threshold in the n dimensional space.

The same approach will be applied in the case in which the vector comprises kinetic parameters derived from successive grey levels, in other words, parameters such as the slope or the maximum grey level.

This learning is also applicable in the case of vectors representing double energy images. The reference vectors (in this case learning vectors) include the results of two contrast readings with different energy for examinations carried out later and the classification results assigned by a visual diagnosis made on these readings by a practitioner or by a laboratory analysis.

According to one variant, means for automatically establishing a classification of zones encountered are provided, while remaining under the guidance of the practitioner. In this approach, the means for processing displays the sequence of images produced. The practitioner examines the sequence of images and identifies at least one zone representative of each class, by experience. The means for processing uses these manual identifications to compare the remainder of the image with the zones thus classified. If the image sequence reveals other zones that appear similar to those identified by the practitioner, then the method and apparatus classifies these zones in the same categories that the practitioner selected for the zones used as reference.

This similarity is identified in the same way as described above, using vectors associated with pixels identified by the practitioner as reference data. The method and apparatus displays the zones considered as being similar and submits this result to the practitioner. In this case, the reference data defining the classes are at least partly defined directly by the practitioner.

In another operating mode, the method and apparatus combined the two approaches mentioned above. In this case, the means for processing makes automatic classification starting from a learning done earlier. The result is displayed on the screen in the form of a map identifying the different zones corresponding to the different classes. In a further step, the user confirms or contradicts the classification made on these different zones. The means for processing takes into account this confirmation or contradiction made by the practitioner. The method and apparatus integrates data learned earlier and the information comprising data reclassified by the practitioner, when a new automatic classification is necessary.

The processing may then be repeated on the same sequence starting from the learning thus updated. In other words, the means for learning means is reactivated after a first automatic classification to include additional learning data like those introduced by the practitioner in the form of confirmations or contradictions of the first result.

The various means described above, for which a classification will be automatically output, may for example be used under the control of software capable of carrying out the various processing steps when it is implemented on an appropriate processor.

Obviously, the various arrangements or processing described above, and others comprising improvements thereof, can be combined differently in each of the disclosed embodiments to achieve the same result.

One skilled in the art may make or propose various modifications to the structure/way and/or function and/or results and/or steps of the disclosed embodiments and equivalents thereof without departing from the scope and extant of the invention.

What is claimed is:

1. An apparatus for medical imaging comprising:
   means for exposing an object to radiation;
   means for collecting the radiation after attenuation through the object;
   means for processing recorded attenuations; and
   means for displaying a result of the processing in the form of a representation on an image of the object;
   wherein the means for processing the recorded attenuations forms means for automatic classification of zones of the object into pathological or non-pathological classes, the means for automatic classification taking account of at least one classification input into the apparatus in advance in association with data that can be collected by the apparatus, and using this prior classification as a reference in order to produce a classification of the same type if there is similarity between the collected data and the data associated with this reference classification; and
   wherein the means for automatic classification makes a classification of pixels of an image of the object at the same location in a several dimensional space, the dimensions of this space each corresponding to the value of a grey level at a given instant of a contrast appearance rate at the pixel considered.

2. The apparatus according to claim 1 wherein the several dimensional space further comprises dimensions that each represent a parameter among the maximum slope of a contrast variation, the value of a maximum contrast reached, a hold duration of the contrast at its maximum value, at the pixel considered.

3. The apparatus according to claim 2 wherein the several dimensional space further comprises at least two dimensions that each represent the measured signal for two different radiation energies at the pixel considered.

4. The apparatus according to claim 1 wherein the several dimensional space further comprises at least two dimensions that each represent the measured signal for two different radiation energies at the pixel considered.

5. The apparatus according to claim 4 wherein the two different radiation energies are located on opposites sides of a sudden change in an attenuation coefficient of a contrast medium.

6. The apparatus according to claim 1 wherein the means for automatic classification takes account of at least one manual classification of a current image zone of the object as reference classification; and
   automatically establishes the same classification in case of similarity with other data collected on the same object.

7. The apparatus according to claim 1 wherein the means for automatic classification includes means for learning; and
   carrying out recording a collection of reference information comprising several reference classifications associated with data that can be collected by the apparatus.

8. The apparatus according to claim 1 comprising:
   means for enabling a user to confirm or contradict an automatic classification made by the apparatus; and
   means for taking account of this confirmation or contradiction in order to incorporate the results of this confirmation or contradiction as a reference classification.

9. The apparatus according to claim 1 wherein the means for classification identifies incoherent spatial variations in the classification, and modifying the classification of some locations in case of such incoherent spatial variations.

10. The apparatus according to claim 1 comprising means for accounting of one item of data among the number of changes in the sign of the variation in grey levels, the age of the object, weight or medical data, when creating a classification.

11. The apparatus according to claim 1 wherein the means for automatic classification records a vector corresponding to each pixel location in the image of the object, each vector comprising the dimensions of the several dimensional space that correspond to grey levels of the pixel at different times that correspond to an appearance and disappearance of a contrast medium.

12. A method for medical imaging comprising:
    exposing an object to radiation;
    collecting the radiation after attenuation through the object;
    processing recorded attenuations comprising automatic classifying of zones of the object into pathological or non-pathological classes, the automatic classification taking account of at least one classification input in advance in association with data that can be collected, and using this prior classification as a reference in order to produce a classification of the same type if there is similarity between the collected data and the data associated with this reference classification; and
    displaying a result of the processing in the form of a representation on an image of the object the process;
    wherein the automatic classification makes a classification of pixels of the image of the object at the same location in a several dimensional space, the dimensions of this space each corresponding to the value of a grey level at a given instant of a contrast appearance rate at the pixel considered.

13. The method according to claim 12 wherein the several dimensional space further comprises dimensions that each represent a parameter among the maximum slope of a contrast variation, the value of a maximum contrast reached, a hold duration of the contrast at its maximum value, at the pixel considered.

14. The method according to claim 13 wherein the several dimensional space further comprises at least two dimensions that each represent the measured signal for two different radiation energies at the pixel considered.

15. The method according to claim 12 wherein the several dimensional space further comprises at least two dimensions that each represent the measured signal for two different radiation energies at the pixel considered.

16. The method according to claim 15 wherein the two different radiation energies are located on opposites sides of a sudden change in an attenuation coefficient of a contrast medium.

17. The method according to claim 12 wherein the automatic classification takes account of at least one manual classification of a current image zone of the object as reference classification; and automatically establishes the same classification in case of similarity with other data collected on the same object.

18. The method according to claim 12 wherein the automatic classification includes learning; and carrying out recording a collection of reference information comprising several reference classifications associated with data that can be collected by the apparatus.

19. The method according to claim 12 comprising:

enabling a user to confirm or contradict an automatic classification; and taking into account of this confirmation or contradiction in order to incorporate the results of this confirmation or contradiction as a reference classification.

20. The method according to claim 12 wherein the classification identifies incoherent spatial variations in the classification, and modifying the classification of some locations in case of such incoherent spatial variations.

21. The method according to claim 12 comprising:

accounting for one item of data among the number of changes in the sign of the variation in grey levels, the age of the object, weight or medical data, when creating a classification.

22. A computer program product comprising a computer readable medium having computer readable program code means embodied in the medium, the computer readable program code means implementing the method according to claim 12.

23. An article of manufacture for use with a computer system, the article of manufacture comprising a computer readable medium having computer readable program code means embodied in the medium, the program code means implementing of the method according to claim 12.

24. A program storage device readable by a computer tangibly embodying a program of instructions executable by the computer to perform the method according to claim 12.

25. The method according to claim 12 wherein the automatic classification records a vector corresponding to each pixel location in the image of the object, each vector comprising the dimensions of the several dimensional space that correspond to grey levels of the pixel at different times that correspond to an appearance and disappearance of a contrast medium.

* * * * *